United States Patent [19]
Clarke

[11] Patent Number: 5,708,967
[45] Date of Patent: Jan. 13, 1998

[54] COMMUNICATIONS SYSTEM HAVING DIAGONALLY-ARRANGED PAIRS OF SIGNAL PROPAGATORS

[75] Inventor: Ian M. Clarke, Disley, England

[73] Assignee: U.S. Philips Corporation, New York, N.Y.

[21] Appl. No.: 490,825

[22] Filed: Jun. 15, 1995

[30] Foreign Application Priority Data

Jun. 18, 1994 [GB] United Kingdom .................... 9412286

[51] Int. Cl.$^6$ ....................................... H04Q 7/36
[52] U.S. Cl. .................. 455/33.1; 455/34.1; 455/56.1; 379/59
[58] Field of Search .................. 455/33.1–33.4, 455/34.1, 56.1; 379/59, 60

[56] References Cited

U.S. PATENT DOCUMENTS 5,396,646  3/1995  Miller ........................ 455/33.1

FOREIGN PATENT DOCUMENTS 0429200  5/1991  European Pat. Off. .
9323935  11/1993  Germany ..................... H04B 7/26

Primary Examiner—Chi H. Pham
Attorney, Agent, or Firm—Robert J. Kraus

[57] ABSTRACT

A communications system includes a plurality of directional signal propagators, each defining a cell. The cells are arranged in a plurality of rows (R1 to R12), each row including repeating sequences of four propagators transmitting first, second, third and fourth signals (A, B, C, D), respectively, wherein the sequences in successive pairs of contiguous rows (R1, R2 etc.) are offset by one cell, and wherein diagonally arranged pairs of the propagators in pairs of contiguous rows transmit the same signal.

9 Claims, 1 Drawing Sheet

COMMUNICATIONS SYSTEM HAVING DIAGONALLY-ARRANGED PAIRS OF SIGNAL PROPAGATORS

BACKGROUND OF THE INVENTION

The present invention relates to a communications system and particularly, but not exclusively, to a multichannel video distribution system operating at frequencies of the order of 40 GHz.

In the present specification the reference to "frequencies" and "different frequencies" is meant to include signals having different frequencies but the same polarisation and signals having the same frequency but different polarisations, for example vertical and horizontal.

Video distribution systems operating at such frequencies are essentially line of sight transmissions and where these are land based then it is necessary to provide repeater stations at regular intervals. A disadvantage of doing this is that there will be problems of intersymbol interference (ISI) at locations where a receiver is receiving two or more transmissions unless the wanted transmission is at a power 20 dB greater than the unwanted transmission.

A method of reducing the ISI problem is to divide a geographical area into a plurality of cells which are defined by transmitters operating on different frequencies. To avoid problems of ISI, no two adjacent cells operate on the same frequency. Frequency reuse schemes are known in the telecommunications field in which the distance between two cells being operated at the same frequency is sufficiently great that mutual interference is minimal. A drawback to such schemes is that a relatively large number of different frequency channels have to be made available in order to provide satisfactory coverage of a large geographical area.

SUMMARY OF THE INVENTION

An object of the present invention is to minimise the number of frequencies which have to be provided.

According to the present invention there is provided a communications system comprising pairs of cells having substantially diagonally opposite by directed signal propagation means operating at the same frequency.

An embodiment of a communications system made in accordance with the present invention comprises a plurality of directional signal propagation means, each defining a cell, said cells being arranged as a plurality of rows, each row comprising repeating sequences of four propagation means transmitting first, second, third and fourth signals, respectively, wherein the sequences in successive pairs of continuous rows are offset by one cell, and wherein diagonally arranged pairs of said propagation means in pairs of contiguous rows transmit the same signal.

A base station for use in the communications system made in accordance with the present invention may be characterised by transmitting means and first and second substantially oppositely directed signal propagation means coupled to the transmitting means.

The present invention is based on the realisation that by using directional signal propagation means a frequency reuse scheme is possible having no more than four frequency channels and diagonally adjacent cells operating at the same frequency provided that the directions of propagation are opposite and the front to back ratio of the propagation means exceeds a minimum level. A suitable directional signal propagation means may comprise a 64 degree horn antenna having a 28 dB front-to-back ratio and a 17 dB side lobe at 90 degrees. Although only 4 different signal channels are used, a nearest co-frequency, co-directional repeat of four cells is achieved, that is, the distance to the interferer equals five times the distance to the wanted signal and gives a carrier strength (C) to interferer strength (I) ratio equal to 14 dB. The 4 different signal channels may comprise 4 different frequencies having the same polarisation, for example all vertical or all horizontal, or 2 different frequencies, each transmitted with a respective one of two predetermined polarisations, for example vertical and horizontal. In the latter case, the vertically polarised signals may be transmitted at a lower power than the horizontally polarised signals in order to counter the attenuating effects of rain on the cell size when operating at millimetric wavelengths.

BRIEF DESCRIPTION OF THE DRAWINGS

The present invention will now be described, by way of example, with reference to the accompanying drawing, wherein.

In the drawing figures the same reference numerals have been used to indicate corresponding features.

DESCRIPTION OF THE PREFERRED EMBODIMENT

Figures 1, 2:
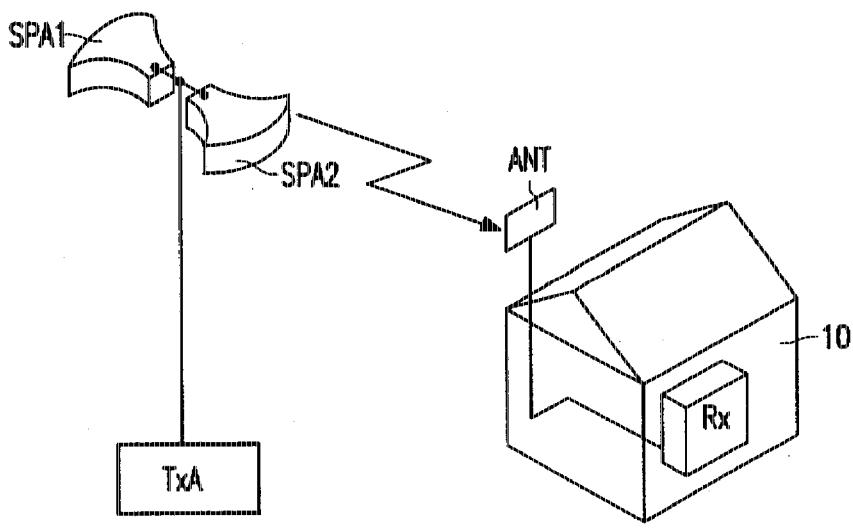
FIG. 1 is a chart showing an example of the frequency reuse scheme used in the communications system in accordance with the present invention.
FIG. 2 is a diagram of the communication system.

Referring to FIG. 1, the chart of the frequency reuse scheme for convenience represents each cell as a square but in reality each cell would be approximately circular. Four signal channels A, B, C and D are provided. The chart comprises a matrix of rows R1 to R12 and columns V1 to V12. Each row comprises a repeating sequence of the signal channels A, B, C and D. The chart may be to considered as pairs of contiguous rows with the even numbered rows offset by one cell space with respect to their adjacent lower numbered rows. The offset in alternate pairs of contiguous rows is opposite each other. More particularly the offsets are defined by the columns V1 to V12. By examination it will be noted that the columns are in repeating groups of 4 with no two columns having the same offset. In the illustrated example, the first four entries in columns V1 to V4 are A, D, B, C; B, A, C, D; C, B, D, A and D, C, A, B; these sequences repeat not only when proceeding down the columns but also in columns V5 to V8 and V9 to V12. In order to minimise interference, directional signal propagation means, for example horn antennas, are disposed back to back and are arranged to direct their radiation outwards from a common point along diametrically opposite paths which are at forty-five degrees to the orthogonal directions of the rows and columns. It has been found that a 64 degree horn antenna having a 28 dB front-to-back ratio and a 17 dB sidelobe at 90 degrees will enable the interfering radiation from back to back signal propagation means operating on the same channel frequency to be maintained at a tolerable level.

Examining FIG. 1 from an interfering point of view indicates that in the row and column directions co-frequency, co-directional repeats occur every 5 cells and in a diagonal direction such repeats also occur every 5 cells. The ratio of the carrier strength (C) to the interferer strength (I) is equal to 14 dB, that is:

C/I=14 dB

Referring to FIG. 2 which for the purposes of explanation illustrates an installation for the cells located at the chart positions R1V1 and R2V2 which have a common meeting point S1 (FIG. 1). Transmitter TxA is coupled respectively to signal propagators SPA1, SPA2 formed by 64 degree horn antennas of the type mentioned above arranged back to back.

A building 10 is shown located in the cell defined by the signed propagation means SPA2. A receive antenna ANT combined with a radio frequency down converter is located on the roof or other convenient location of the building and is connected to a receiving apparatus Rx which may comprise a television receiver. The receive antenna ANT conveniently comprises a patch or dish antenna dimensioned as to maintain the required directivity, such an antenna may have a diameter of between 100 mm and 200 mm.

The signal channels may comprise 4 different frequencies having the same polarisation, for example vertical or horizontal, or 2 different frequencies each of which has 2 polarisations, for example vertical or horizontal. An advantage of 2 frequencies over 4 frequencies is the saving in spectrum. Another factor which has to be taken into account when operating at millimetric frequencies with 2 different polarisations is different attenuation of signals due to say the presence of raindrops and in order to overcome this effect on the effective cell size transmitters producing vertically polarised signals are operated at a lower power than those propagating horizontally polarised signals.

From reading the present disclosure, other modifications will be apparent to persons skilled in the art. Such modifications may involve other features which are already known in the design, manufacture and use of cellular type communication systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:
1. A communications system comprising a plurality of directional signal propagation means, each defining a cell, said cells being arranged as a plurality of rows, each row comprising repeating sequences of four propagation means transmitting first, second, third and fourth signals, respectively, wherein the sequences in successive pairs of contiguous rows are offset by one cell, and wherein diagonally arranged pairs of said propagation means in pairs of contiguous rows transmit the same signal.

2. A communications system as claimed in claim 1, characterised in that said diagonally arranged pair of signal propagation means in a pair of contiguous rows are orthogonal to those in an adjacent pair of contiguous rows.

3. A communications system as claimed in claim 2, characterised in that the first and second signals and the third and fourth signals respectively comprise orthogonal polarisations of first and second frequencies.

4. A communications system as claimed in claim 3, characterised in that said orthogonal polarisations are respectively vertical and horizontal and in that the vertically polarised signals are propagated at a lower power than the horizontally polarised signals.

5. A communications system as claimed in claim 1, characterised in that each signal propagation means comprises a horn antenna.

6. A communications system as claimed in claim 1, characterised in that each signal propagation means comprises a sixty-four degree horn antenna having a 28 dB front to back ratio and a 17 dB sidelobe at ninety degrees.

7. A communications system as claimed in claim 1, characterised in that the first and second signals and the third and fourth signals respectively comprise orthogonal polarisations of first and second frequencies.

8. A communications system as claimed in claim 7, characterised in that said orthogonal polarisation are respectively vertical and horizontal and in that the vertically polarised signals are propagated at a lower power than the horizontally polarised signals.

9. A base station for use in the communications system as claimed in claim 1, characterised by transmitting means and first and second substantially oppositely directed signal propagation means coupled to the transmitting means.

* * * * *